United States Patent
Van De Ven (10) Patent No.: US 7,480,222 B2
(45) Date of Patent: Jan. 20, 2009

(54) DISC DRIVE APPARATUS, AND METHOD FOR RECOGNIZING CD AND DVD

(75) Inventor: Johannes Paulus Hubertus Van De Ven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 362 days.

(21) Appl. No.: 10/569,680

(22) PCT Filed: Aug. 18, 2004

(86) PCT No.: PCT/IB2004/051480

§ 371 (c)(1),
(2), (4) Date: Feb. 27, 2006

(87) PCT Pub. No.: WO2005/022529

PCT Pub. Date: Mar. 10, 2005

(65) Prior Publication Data

US 2007/0002710 A1    Jan. 4, 2007

(30) Foreign Application Priority Data

Sep. 2, 2003   (EP)   ................................ 03103267

(51) Int. Cl.
G11B 7/00   (2006.01)

(52) U.S. Cl. .................................................... 369/53.22

(58) Field of Classification Search .............. 369/53.22, 369/53.23, 47.1, 44.26
See application file for complete search history.

(56) References Cited

U.S. PATENT DOCUMENTS

| 5,710,749 | A | | 1/1998 | Tsukai et al. |
| 5,959,955 | A | * | 9/1999 | Choi ........................ 369/53.23 |
| 6,061,318 | A | | 5/2000 | Hwang |
| 6,111,832 | A | * | 8/2000 | Tsuchiya et al. ......... 369/53.23 |
| 2004/0022156 | A1 | | 2/2004 | Choi |

FOREIGN PATENT DOCUMENTS

| JP | 11149640 A | 6/1999 |
| JP | 2001357539 A | 12/2001 |

OTHER PUBLICATIONS

ISR Publication, International Publication No. WO2005/022529A1.

* cited by examiner

*Primary Examiner*—Nabil Z Hindi
(74) *Attorney, Agent, or Firm*—Michael E. Belk (57) ABSTRACT

A method for recognizing type (CD; DVD) of an optical disc, wherein: a light beam (32) is caused to reflect from the optical disc (2); wherein an optical lens (34) is caused to move axially with respect to said optical disc (2); a detector output signal ($S_R$) is analyzed to detect when (P1; $t_s$) a focus point of said light beam (32) substantially coincides with a disc surface and to detect when (P2; $t_L$) said focus point substantially coincides with an information layer wherein a thickness time Δt is calculated in accordance with the formula: $\Delta t = t_L - t_s$ and wherein the measured thickness time Δt is compared with a reference value ($\Delta t_{REF}$) which is calculated from an experience-based average value ($\Delta t_{AV}(CD)$) of the thickness time 66 t of CD discs, or from an experience-based average value ($\Delta t_{AV}(DVD)$) of the thickness time Δt of DVD discs, or from both.

14 Claims, 6 Drawing Sheets

DISC DRIVE APPARATUS, AND METHOD FOR RECOGNIZING CD AND DVD

The present invention relates in general to a disc drive apparatus for writing/reading information into/from an optical storage disc; hereinafter, such disc drive apparatus will also be indicated as "optical disc drive". The present invention relates further to a method for identifying the type of a disc inserted in the disc drive apparatus.

As is commonly known, optical discs have been developed according to different formats. By way of example, CD and DVD are mentioned here, but the gist of the present invention is also applicable to other disc types. Conventionally, disc drives have been developed as dedicated devices, i.e. suitable for one disc type only. Thus, for instance, optical disc drives of CD type have been developed on the one hand, and optical disc drives of DVD type have been developed on the other hand. Such dedicated disc drives are suitable for one type of optical disc only; if the wrong type of disc is inserted in such drive, the disc drive can not handle the disc and responds with an error message. In other words, such dedicated disc drives know what type of disc to expect, "wrong types" are handled according to the format of the expected disc type.

More recently, disc drives have been developed which are capable of handling two (or more) different types of disc. Such type of disc drive will be indicated as multiple-type drive. As a specific example, a multiple-type drive for handling CDs and DVDs will be described in the following, but it is to be noted that such description is not intended to restrict the protective scope of the present invention to this example since the gist of the present invention is also applicable to other types of disc.

Since a multiple-type drive may expect a disc to be any of two (or more) different types of disc, it needs to ascertain the type of disc when a new disc is inserted, in order to be able to handle the disc with the correct format.

Thus, in a multiple-type drive, there is a need for a method and apparatus for determining disc type.

One known way of determining disc type may be indicated as "trial-and-error". The disc drive first assumes that the disc is a first type, for instance CD, and performs a number of tests according to CD format which a CD will pass but a different type of disc, for instance DVD, will fail. If the disc passes the tests, it is determined as CD type. If the disc fails, the disc drive assumes that the disc is DVD type, and performs a number of tests according to DVD format. If the disc passes the second run of tests, it is determined as DVD type. This known way of determining disc type, although leading to reliable results, has a disadvantage of being rather time-consuming. In the following, this known way of determining disc type will be indicated as traditional tests.

Therefore, a main objective of the invention is to provide a disc type determination method which takes less time without reducing reliability.

A great improvement would be achieved if CDs and DVDs have a mutually different value for a certain measurable parameter. Then, the type of disc could be ascertained directly by measuring such parameter.

An important characteristic distinguishing CDs and DVDs from each other is the distance between disc surface and storage layer, indicated hereinafter as the thickness of the disc. A CD has a thickness of 1.2 mm whereas a DVD has a thickness of 0.6 mm. Thus, a method to recognize a CD and a DVD, or at least to distinguish between CD and DVD, has been developed on the basis of measuring the thickness of the disc: if the thickness appears to be approximately 0.6 mm (or less than a reference value, e.g. 0.9 mm) it is concluded that the disc is a DVD, whereas, if the thickness appears to be approximately 1.2 mm (or more than a reference value, e.g. 0.9 mm) it is concluded that the disc is a CD.

U.S. Pat. No. 6,061,318 discloses a method for discriminating disc type on the basis of the thickness of the disc. The focal actuator is controlled with a ramping voltage to axially displace the objective lens such that the focal point of the laser beam is axially displaced towards the disc, and the focal error signal is monitored. A characteristic of the focal error signal indicates when the focal point reaches the surface of the disc at a first moment in time, and when the focal point reaches an information layer at a second moment in time. The thickness of the disc may be calculated from the time distance between the first and the second moment in time, taking the displacement speed of the optical lens into account, which depends on the slope of the actuator driving voltage.

An advantage of this method is that it provides a determination result quickly. However, according to the publication, the method is used as an absolute measurement of thickness. This is, however, not very reliable. First, the displacement speed of the optical lens is not accurately known, because the actuator sensitivity, i.e. displacement as a function of control voltage (mm/V), is not an accurately known constant. Typically, this sensitivity ranges from 0.65 mm/V to 1.3 mm/V. Even for one specific actuator, this sensitivity may vary with age of the actuator, and condition (e.g. temperature) of the actuator. Thus, even if the time distance between said first and second moments is determined very accurately, there is uncertainty in the corresponding spatial distance.

Second, the thickness of CDs and DVDs may show a certain variation.

Therefore, a further objective of the present invention is to overcome these problems.

More specifically, the present invention aims to provide an improved disc recognition method which takes into account variations in disc thicknesses and variations in actuator sensitivity.

According to an important aspect of the present invention, a disc drive, after first being taken into operation, is first operated in a learning stage wherein data is collected regarding the thicknesses of CDs and DVDs inserted into the disc drive. From the collected data, an average CD thickness and an average DVD thickness are calculated. When the amount of collected data is sufficiently large, so that the calculated average CD thickness and the calculated average DVD thickness are considered to be sufficiently reliable, the disc drive makes a transition to operation in a second stage wherein the disc determination is based on a comparison of the measured thickness with a determination threshold thickness derived from the calculated average CD thickness and the calculated average DVD thickness.

These and other aspects, features and advantages of the present invention will be further explained by the following description with reference to the drawings, in which same reference numerals indicate same or similar parts, and in which.

Figure 1:
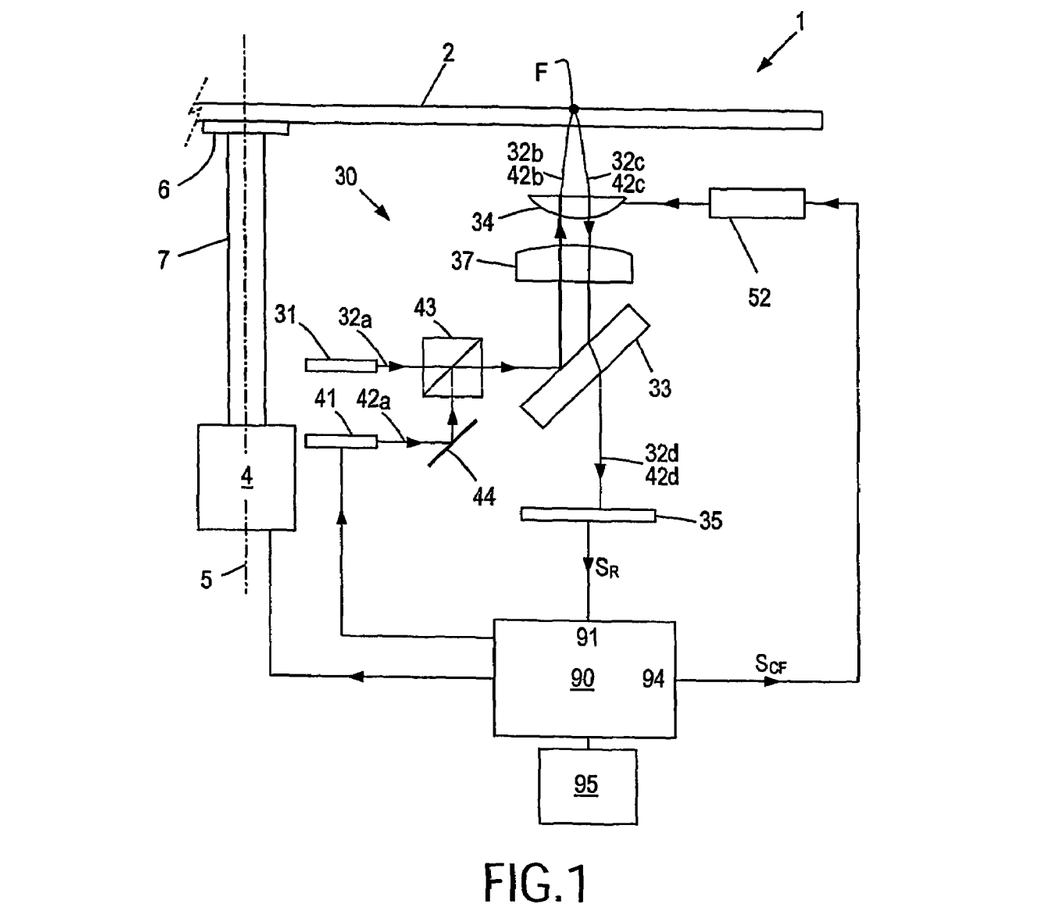
FIG. 1 schematically illustrates some relevant components of an optical disc drive apparatus.

FIG. 1 schematically illustrates an optical disc drive apparatus 1, suitable for storing information on or reading information from an optical storage disc 2, typically a DVD or a CD. The optical disc 2 comprises at least one track, either in the form of a continuous spiral or in the form of multiple concentric circles, of storage space where information may be stored in the form of a data pattern. The optical disc may be read-only type, where information is recorded during manufacturing, which information can only be read by a user. The optical disc may also be a writable type, where information may be stored by a user. Since the technology of optical discs in general, the way in which information can be stored in an optical disc, and the way in which optical data can be read from an optical disc, is commonly known, it is not necessary here to describe this technology in more detail.

For rotating the disc 2, the disc drive apparatus 1 comprises a motor 4 fixed to a frame (not shown for sake of simplicity), defining a rotation axis 5. For receiving and holding the disc 2, the disc drive apparatus 1 may comprise a turntable or clamping hub 6, which in the case of a spindle motor 4 is mounted on the spindle axle 7 of the motor 4.

The disc drive apparatus 1 further comprises an optical system 30 for scanning tracks of the disc 2 with an optical beam. More specifically, in the exemplary arrangement illustrated in FIG. 1, the disc drive apparatus 1 is a multiple-type drive designed for handling two types of disc, i.e. CD as well as DVD for example. The optical system 30 comprises a first light beam generating means 31 and a second light beam generating means 41, each typically a laser such as a laser diode, each arranged to generate a first light beam 32 and a second light beam 42, respectively. In the following, different sections of the optical path of a light beam 32, 42 will be indicated by a character a, b, c, etc added to the reference numeral 32, 42, respectively. It is noted that, in a disc drive apparatus designed for handling only one type of disc, i.e. only CD for example, typically only one laser diode will be present.

The first light beam 32 passes a first beam splitter 43, a second beam splitter 33, a collimator lens 37 and an objective lens 34 to reach (beam 32b) the disc 2. The first light beam 32b reflects from the disc 2 (reflected first light beam 32c) and passes the objective lens 34, the collimator lens 37 and the second beam splitter 33 (beam 32d) to reach an optical detector 35.

The second light beam 42 is reflected by a mirror 44, passes the first beam splitter 43, and then follows an optical path comparable with the optical path of the first light beam 32, indicated by reference numerals 42b, 42c, 42d.

The objective lens 34 is designed to focus one of the two light beams 32b, 42b in a focal spot F on an information layer (not shown for sake of simplicity) of the disc 2, which spot F normally is circular. For explaining the present invention, it will be assumed in the following that only the first laser 31 is operated and that the second laser 41 is OFF.

During operation, the light beam should remain focused on the recording layer. To this end, the objective lens 34 is arranged axially displaceable, and the optical disc drive apparatus 1 comprises a focal actuator 52 arranged for axially displacing the objective lens 34 with respect to the disc 2. Since axial actuators are known per se, while further the design and operation of such axial actuator is no subject of the present invention, it is not necessary here to discuss the design and operation of such focal actuator in great detail.

It is noted that means for supporting the objective lens with respect to an apparatus frame, and means for axially displacing the objective lens, are generally known per se. Since the design and operation of such supporting and displacing means are no subject of the present invention, it is not necessary here to discuss their design and operation in great detail.

The disc drive apparatus 1 further comprises a control circuit 90 having an output 94 coupled to a control input of the focal actuator 52, and a read signal input 91 for receiving a read signal $S_R$ from the optical detector 35. The control circuit 90 is designed to generate at its output 94 a control signal $S_{CF}$ for controlling the focal actuator 52.

Figure 2:
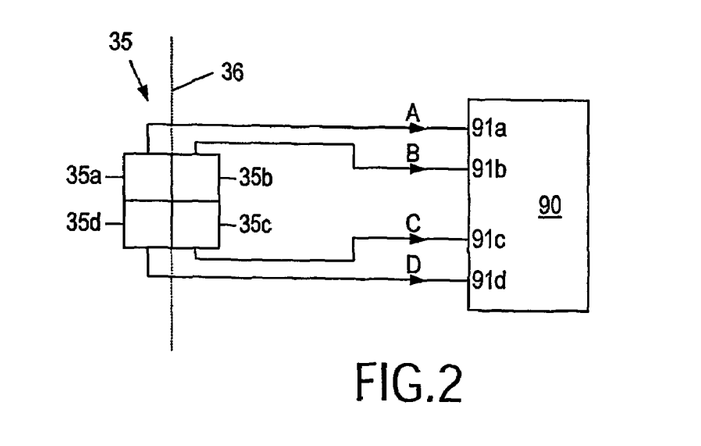
FIG. 2 schematically illustrates an optical detector.

FIG. 2 illustrates that the optical detector 35 comprises a plurality of detector segments, in this case four detector segments 35a, 35b, 35c, 35d, capable of providing individual detector signals A, B, C, D, respectively, indicating the amount of light incident on each of the four detector quadrants, respectively. A center line 36, separating the first and fourth segments 35a and 35d from the second and third segments 35b and 35c, has a direction corresponding to the track direction. Since such four-quadrant detector is commonly known per se, it is not necessary here to give a more detailed description of its design and functioning.

FIG. 2 also illustrates that the read signal input 91 of the control circuit 90 actually comprises four inputs 91a, 91b, 91c, 91d for receiving said individual detector signals A, B, C, D, respectively. The control circuit 90 is designed to process said individual detector signals A, B, C, D, in order to derive data and control information therefrom, as will be clear to a person skilled in the art. For instance, a data signal $S_D$ can be obtained by summation of all individual detector signals A, B, C, D according to $$S_D = A+B+C+D \qquad (1)$$

This data signal $S_D$ is also indicated as central aperture signal CA.

Figure 3A:
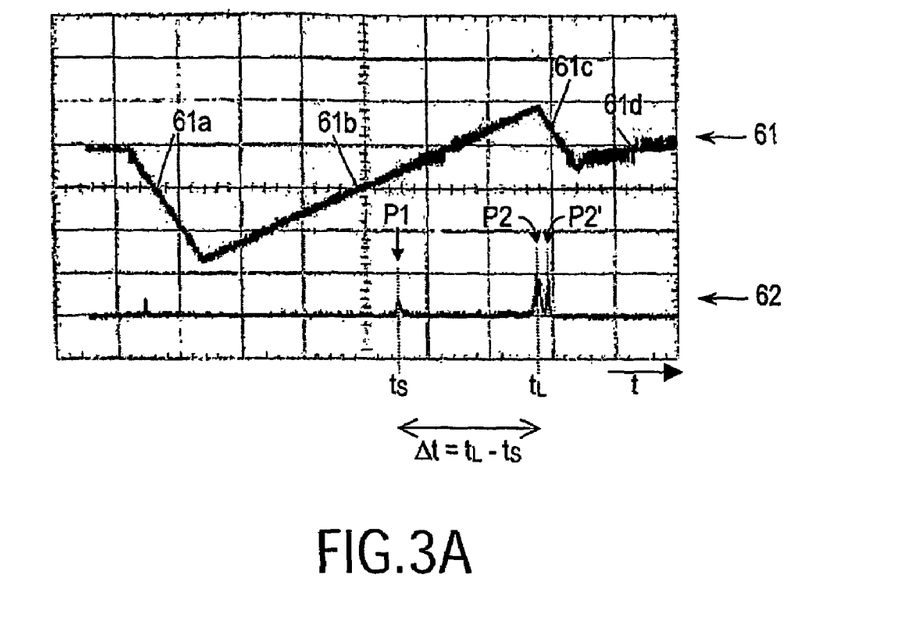
FIGS. 3A and 3B are graphs illustrating results of measurements.
Figure 3B:
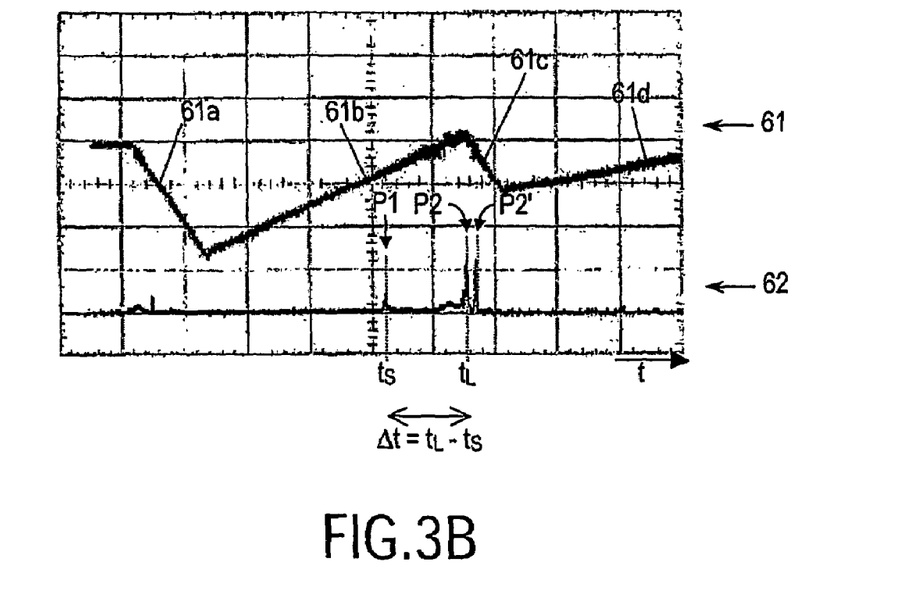

FIGS. 3A and 3B are graphs illustrating results of measurements performed on a specimen of a CD disc (FIG. 3A) and a DVD+R disc (FIG. 3B). Particularly, these graphs illustrate the optical signals obtained when the focus actuator 52 displaces the objective lens 34. The horizontal axis represents time (32 ms/div), the vertical axis represents the voltage of the focus actuator control signal $S_{CF}$ (upper curve) and the intensity of the central aperture signal CA (lower curve). The curve 61 indicates a control voltage $S_{CF}$ applied by the control circuit 90 to the focus actuator 52, and the curve 62 indicates the central aperture signal CA, as a function of time. First, the objective lens 34 is withdrawn from the disc by decreasing the actuator voltage (line segment 61a). Then, the actuator control voltage is increased at a substantially constant rate (line segment 61b), so that the objective lens 34 is moved towards the disc 2 at a substantially constant velocity. Initially, the focus point of the laser beam 32b is well below the lower surface of the disc, and the detector 35 receives only little reflected light. When the focus point approaches the lower surface of the disc, the central aperture signal CA increases, and reaches a maximum at time $t_S$ when the focus point coincides with the lower surface of the disc. Thus, the central aperture signal CA shows a first peak P1 at time $t_S$.

With a further increase of the control voltage $S_{CF}$, the focus point of the laser beam 32b is between the lower disc surface and the information layer, and the detector 35 again receives only little reflected light until at time $t_L$ the focal point coincides with the information layer. Thus, the central aperture signal CA shows a second peak P2 at time $t_L$.

In this experiment, the focus actuator control signal $S_{CF}$ was decreased in order to withdraw the objective lens 34 immediately on the focal point's reaching of the information layer (line portion 61c), which accounts for the second occurrence of the second peak, indicated as P2'. Still later, the actuator is moved towards the disc again at a lower speed (line portion 61d). In use, normally, a focus servo system is adapted to control the focus actuator to maintain the objective lens in the position corresponding to the second peak P2.

FIGS. 3A-B also show that the first peak P1 has a smaller amplitude than the second peak P2.

It is noted that in both cases, the control signal increase rate (dS/dt) during the forwarding of the objective lens 34 (line portion 61b), or at least during the time interval $\Delta t$ between $t_L$ and $t_S$, is the same, so that the traveling speed v of the optical lens 34 is the same in both cases.

The speed v of the optical lens 34 can be calculated from the duration of the time interval $\Delta t = t_L - t_S$, which can be determined rather accurately, according to formula (2):

$$v = D/\Delta t \quad (2)$$

assuming, of course, that the speed v of the optical lens 34 is constant during said time interval. In this formula (2), D represents the distance between lower disc surface and information layer. Measuring from FIG. 3A, assuming that D(CD)=1.2 mm, the speed v is approximately 17 mm/s. Measuring from FIG. 3B, assuming that D(DVD)=0.6 mm, the speed v is approximately 14 mm/s.

Conversely, said distance D can be calculated from the time interval $\Delta t$ according to formula (3):

$$D = v * \Delta t \quad (3)$$

if the speed v of the optical lens 34 remains constant during this time interval $\Delta t$, and if this speed is known, or at least if the average speed during said time interval $\Delta t$ is known sufficiently accurately. Then, by comparing the calculated thickness D with a suitable reference value $D_{REF}$, for instance $D_{REF}$=0.9 mm, the control circuit 90 may decide that the disc 2 is a CD if $D > D_{REF}$ and that the disc 2 is a DVD if $D < D_{REF}$. From the graphs in FIGS. 3A and 3B, it can be seen that this determination can be done relatively quickly, i.e. within approximately 200 ms.

As already mentioned, a practical problem in implementing this method is the fact that the thickness of CD discs may deviate from the theoretical value of 1.2 mm, that the thickness of DVD discs may deviate from the theoretical value of 0.6 mm, and that the actuator assemblies of different disc drives may have different control sensitivities so that the actual speed v of the objective lens is not known sufficiently accurately.

The present invention proposes to solve this problem by generating a history-based reference value, which takes variations of discs and uncertainties of actuator speed into account. This will be explained with reference to FIG. 4, which is a graph illustrating, basically, the thickness frequency of different discs.

Figure 4:
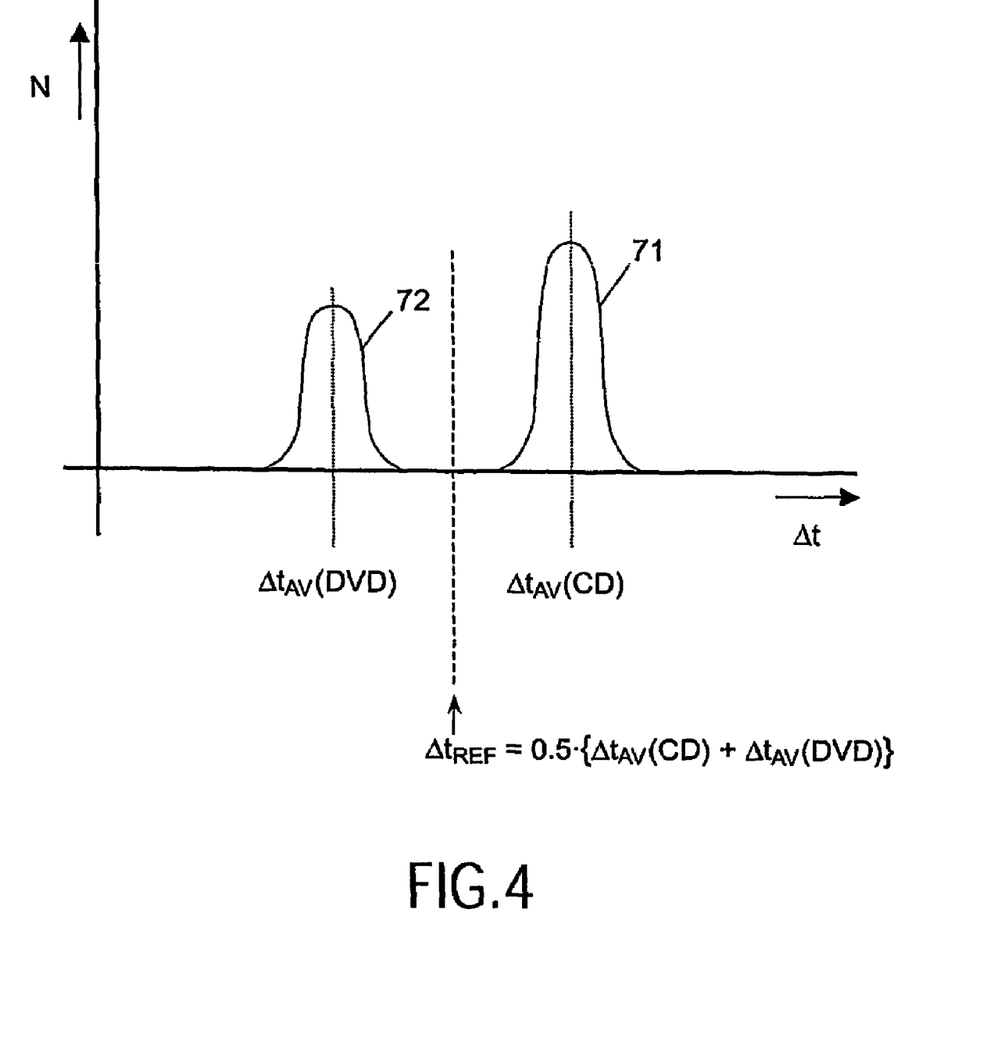
FIG. 4 is a graph illustrating the thickness frequency of different discs.

Assume that the above-mentioned experiment is repeated for a large number of CD discs and DVD discs, using one disc apparatus, the actuator control signal increase rate (dS/dT) being kept constant in all measurements. For each disc, the said time interval $\Delta t$ is measured, this time interval hereinafter being indicated as "thickness time", which is considered as a measurable parameter of discs. The results are plotted in a graph like FIG. 4, wherein the horizontal axis represents thickness time $\Delta t$, and wherein the vertical axis represents the frequency of the measured thickness times $\Delta t$, i.e. the number $N(\Delta t)$ of discs which have a specific value of the thickness time $\Delta t$. FIG. 4 illustrates that the measurement results will fall in two clusters, represented by two curves 71 and 72 having a substantially bell-shaped contour or Gaussian contour. The first curve 71, corresponding to the larger thickness times, is associated with discs having the larger thicknesses, i.e. CD discs. The second curve 72, corresponding to the smaller thickness times, is associated with DVD discs.

It is noted that the two curves do not need to have the same peak height, as this height depends inter alia on the number of discs of each type that have been measured. In the example of FIG. 4, the number of measured CDs is larger than the number of measured, DVDs.

According to the invention, an average CD thickness time $\Delta t_{AV}(CD)$ can be determined on the basis of the measurement results. This average can for instance be determined as the thickness time corresponding to the peak of curve 71. More conveniently, however, such average is determined as the summation of all thickness times measured for CDs, divided by the number of measured CDs. Likewise, an average DVD thickness time $\Delta t_{AV}(DVD)$ can be determined as the summation of all thickness times measured for DVDs, divided by the number of measured DVDs.

Further, according to the invention, a reference thickness time $\Delta t_{REF}$ can be determined on the basis of the measured average CD and DVD thickness times, for instance according to $\Delta t_{REF} = (\Delta t_{AV}(CD) + \Delta t_{AV}(DVD))/2$.

It is noted that, in the above-mentioned measurements, it was preferred that the type of disc was known on measurement, so that the measurement result could contribute to the calculation of either $\Delta t_{AV}(CD)$ or $\Delta t_{AV}(DVD)$. Having established these data, it is possible to determine type of an unknown disc by measuring its thickness time $\Delta t_M$ and comparing this measured thickness time $\Delta t_M$ with the reference thickness time $\Delta t_{REF}$ as defined above. For instance, it can be determined that the disc is a CD if $\Delta t_M > \Delta t_{REF}$ and that the disc is a DVD if $\Delta t_M < \Delta t_{REF}$.

An important advantage of this method is that it is not necessary to actually calculate the absolute thickness D of a disc. A further advantage is that the method does not depend on the actual actuator sensitivity. If different disc drives perform the same measurements on the same group of discs, it may be that the average CD and DVD thickness times are mutually different in the different disc drives, corresponding to mutual differences in actuator sensitivity. But the same mutual differences will be found if different disc drives measure the thickness time of a new disc. These differences compensate each other.

Figure 5:
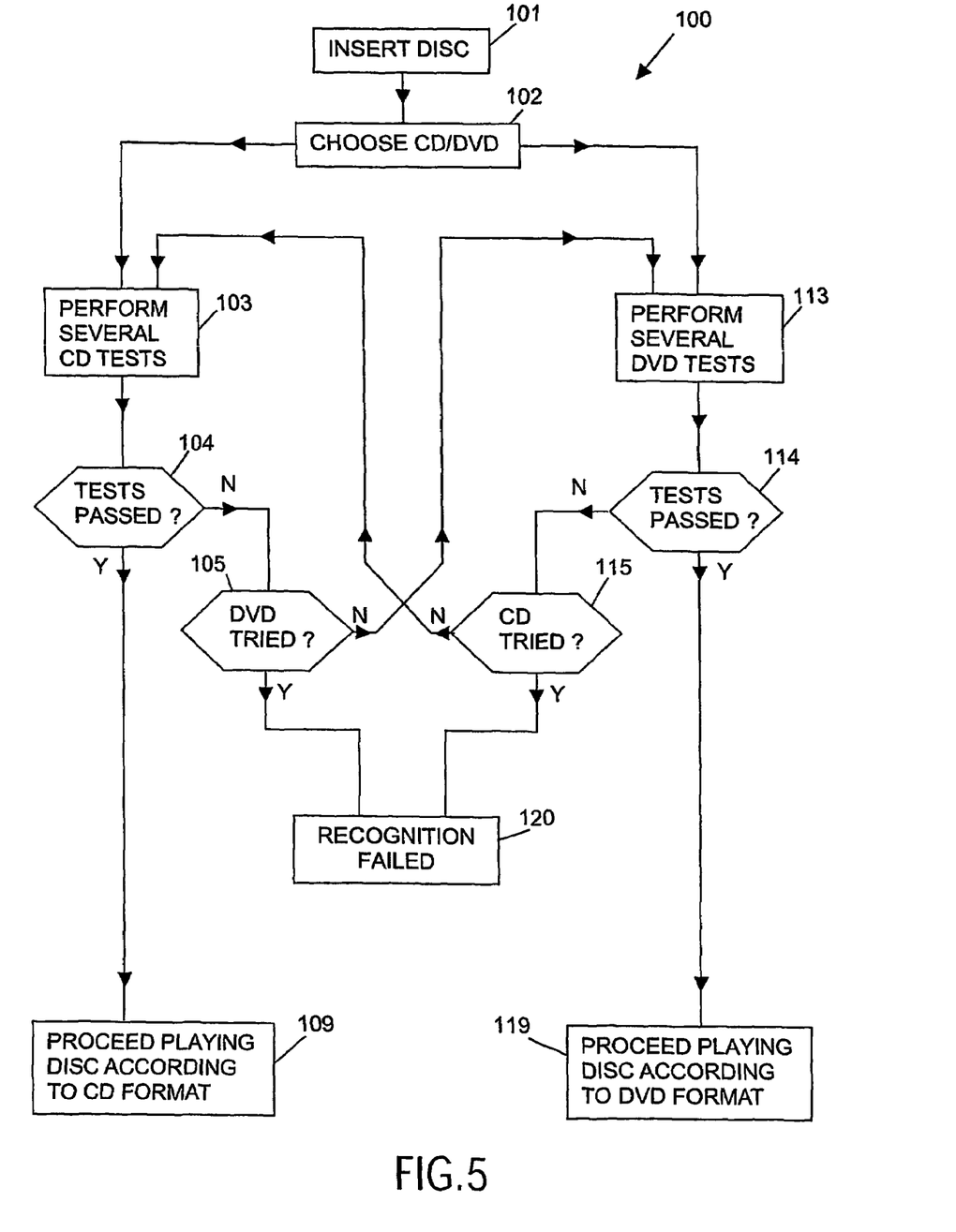
FIG. 5 is a flow diagram schematically illustrating a traditional disc recognition procedure.

FIG. 5 is a flow diagram schematically illustrating a traditional disc recognition procedure 100. After a new disc is inserted into the disc drive [step 101], the controller tries whether the disc is a CD or a DVD. To that end, the disc is subjected to several CD tests [step 103] and/or several DVD tests [step 113]. The controller 90 first has to decide [step 102] which tests are to be performed first; this decision may be made on the basis of experience by the disc drive that the user uses mainly discs of one type, for instance CDs, in which case the controller will choose to proceed on the assumption that it is most likely that the disc is a CD and therefore proceed with step 103. If the disc passes these tests [step 104], the controller decides that the disc is a CD and will proceed with handling the disc according to CD format [step 109]. If, in contrast, the disc does not pass the tests, the controller checks whether the disc has already been subjected to DVD tests [step 105]. If not, then the controller proceeds with subjecting the disc to DVD tests [step 113], and to check whether the disc passes these tests [step 114]. If the disc passes the DVD tests, then the controller is satisfied that the disc is a DVD, and will proceed with handling the disc according to DVD format [step 119]. If, in contrast, the disc does not pass the DVD tests, and has already failed the CD tests [step 115], the recognition procedure has failed [step 120], probably because there is some kind of problem like the disc may be damaged.

This procedure has the disadvantage of being time-consuming, but has the advantage of providing reliable disc type determination results.

Figure 6:
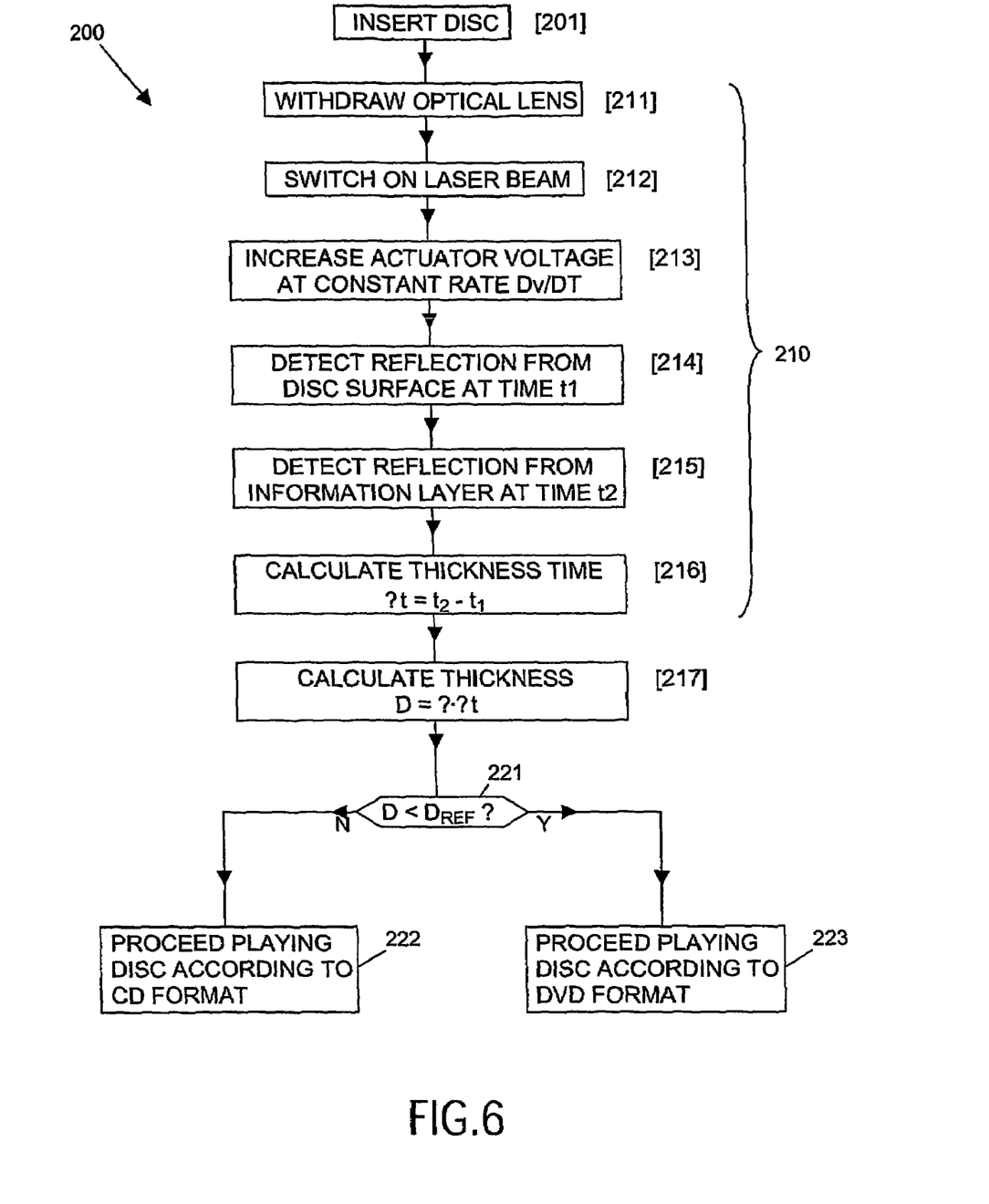
FIG. 6 is a flow diagram schematically illustrating a prior art disc recognition procedure.

FIG. 6 is a flow diagram schematically illustrating a prior art disc recognition procedure 200 based on measuring the thickness D of the disc. After a new disc is inserted into the disc drive [step 201], the controller determines the thickness D of the disc by timing different reflections [procedure 210]. This involves the steps of withdrawing the optical lens from the disc [step 211], switching on the laser beam [step 212], and controlling the focal actuator with a control voltage V which is increased at a constant rate dV/dt in order to move the optical lens towards the disc with a substantially constant speed v [step 213]. When a first reflection peak P1 is received from the disc surface, the corresponding time t1 is noted [step 214]. When a second reflection peak P2 is received from the information layer, the corresponding time t2 is noted [step 215]. The thickness time $\Delta t=t2-t1$ is calculated [step 216], and the thickness D is calculated as $D=\gamma \cdot \beta \cdot \Delta t$ [step 217], wherein $\gamma$ is the sensitivity of the actuator (mm/V), and wherein $\beta$ is the control voltage increase rate (dV/dt).

Alternatively, at time t1 a timer is started, which is stopped at time t2, so that the timer value indicates $\Delta t$.

As an other alternative, at time t1 the corresponding actuator control voltage V1 is noted, at time t2 the corresponding actuator control voltage V2 is noted, and the thickness D is calculated as $D=\gamma \cdot (V2-V1)$.

The measured thickness D of this disc is compared [step 221] to a reference thickness $D_{REF}$, e.g. 0.9 mm, which is stored in a memory as a fixed value. If the measured thickness D is larger than the reference thickness $D_{REF}$, the controller decides that the disc is a CD and will proceed with handling the disc according to CD format [step 222]. If the measured thickness D is smaller than the reference thickness $D_{REF}$, the controller decides that the disc is a DVD and will proceed with handling the disc according to DVD format [step 223].

This procedure has the advantage of being fast, but the disadvantage of being less reliable due to uncertainties in the actuator sensitivity $\gamma$ and due to the fact that the fixed value of the reference thickness $D_{REF}$ may not be a suitable value.

Figure 7:
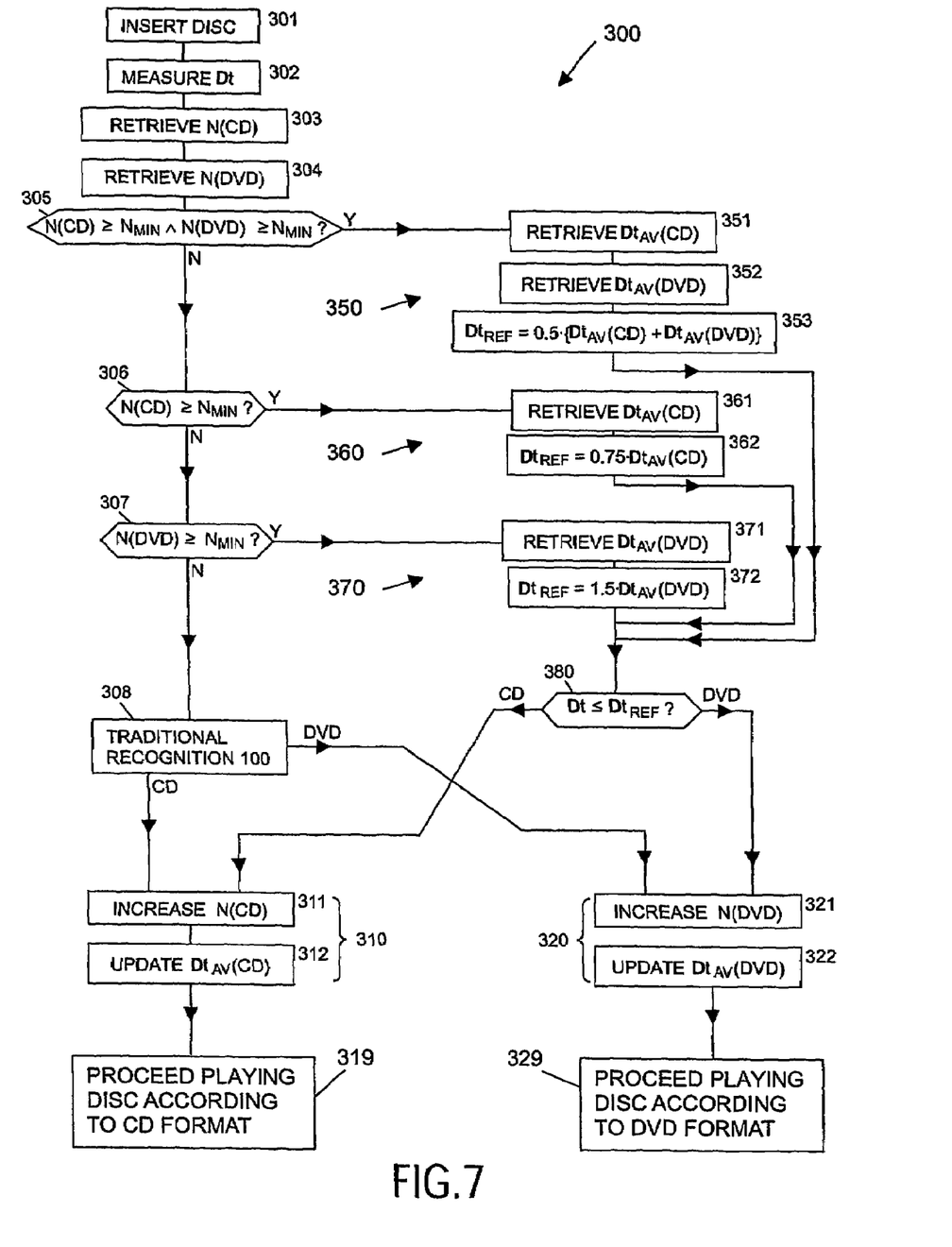
FIG. 7 is a flow diagram schematically illustrating a disc recognition procedure according to the present invention.

FIG. 7 is a flow diagram schematically illustrating a disc recognition procedure 300 according to the present invention. After a new disc is inserted into the disc drive [step 301], the controller 90 measures the thickness time $\Delta t$ of this disc [step 302], which involves substeps which may be identical to the steps 211-216 described above with reference to FIG. 6.

Then, the controller checks whether the number of previously handled CD discs and DVD discs is sufficiently high. To this end, the controller retrieves from an associated memory 95 the number N(CD) of previously handled CD discs [step 303] and retrieves from memory 95 the number N(DVD) of previously handled DVD discs [step 304]. Then, the controller 90 checks whether $N(CD) \geq N_{MIN}$ and whether $N(DVD) \geq N_{MIN}$ [step 305]. Herein, $N_{MIN}$ is a predetermined minimum.

If not, the controller checks whether $N(CD) \geq N_{MIN}$ for CD only [step 306] or whether $N(DVD) \geq N_{MIN}$ for DVD only [step 307].

The numbers N(CD) and N(DVD) are counter values stored in said memory, and increased by one each time a new disc is inserted in the disc drive and determined to be a CD or a DVD, respectively. Initially, when a disc drive is taken into use for the first time, those counter values N(CD) and N(DVD) are zero. Further, during a first stage of the lifetime of the disc drive, these counter values increase with every new CD or DVD inserted, but they are still below the predetermined minimum number $N_{MIN}$. Thus, during the first lifetime stage, the checks of steps 305, 306, 307 will turn out negative. Then, the controller 90 will perform a traditional disc type recognition procedure, for instance procedure 100 described above with reference to FIG. 5.

As a result, it may be that the disc is determined as being a CD (positive result on step 104). Then, the controller 90 performs a CD statistics update procedure 310, which includes increasing the counter N(CD) by one [step 311], and updating an average value $\Delta t_{AV}(CD)$ [step 312].

In a possible implementation, the summation $\Sigma(CD)$ of all measured CD thickness times $\Delta t(CD)$ may be stored in said memory. In that case, the updating step 312 involves adding the present thickness time $\Delta t$ to the summation value stored in memory, according to $\Sigma(CD)_{NEW}=\Sigma(CD)_{OLD}+\Delta t$. The average value $\Delta t_{AV}(CD)$ may then be calculated as $\Delta t_{AV}(CD)=\Sigma(CD)/N(CD)$. In that case, all measured CD thickness times $\Delta t(CD)$ have the same weight.

In a preferred implementation, the average value $\Delta t_{AV}(CD)$ is a running average wherein recent measurements have larger weight than older measurements. This can be achieved by only talking the last few (for instance 10) measurements into account. Preferably, however, this is achieved by calculating an average value $\Delta t_{AV}(CD)$ according to the following formula:

$$\Delta t_{AV}(CD)_{NEW}=(1-x) \cdot \Delta t_{AV}(CD)_{OLD}+x \cdot \Delta t,$$

wherein x is a predefined factor between 0 and 1.

A suitable value for x is 0.1.

Finally, the controller will proceed with handling the disc according to CD format [step 319].

Likewise, it may be that the disc is determined as being a DVD (negative result on step 104). Then, the controller 90 performs a DVD statistics update procedure 320, which includes increasing the counter N(DVD) by one [step 321], and updating an average value $\Delta t_{AV}(DVD)$ [step 322]. The DVD average value $\Delta t_{AV}(DVD)$ may be defined and updated similar to the CD average value $\Delta t_{AV}(CD)$, *mutatis mutandis*, so that the DVD average value $\Delta t_{AV}(DVD)$ is preferably updated according to the following formula:

$$\Delta t_{AV}(DVD)_{NEW}=(1-x) \cdot \Delta t_{AV}(DVD)_{OLD}+x \cdot \Delta t$$

Finally, the controller will proceed with handling the disc according to DVD format [step 329].

It should be evident that the above procedure is followed each time a new CD or DVD disc is inserted into the disc drive as long as the minimum number $N_{MIN}$ has not been reached yet for CD and DVD. When the disc drive gets "older", the counters N(CD) and N(DVD) rise, at a rate depending on the frequency of use. The first stage of the lifetime of the disc drive ends when either the CD counter N(CD) or the DVD counter N(DVD) has reached said minimum number $N_{MIN}$; it depends on the user which of these counters will be the first to reach said minimum number $N_{MIN}$. The predefined minimum number $N_{MIN}$ is chosen such that it is statistically justified to use the average $\Delta t_{AV}(CD)$ or $\Delta t_{AV}(DVD)$, respectively, for making decisions. A suitable value for $N_{MIN}$ is for instance 10, but this value may be chosen higher if desired.

After the first stage of its lifetime, the disc drive will in future determine the disc type on the basis of the measured thickness time $\Delta t$ (result of step 302), which is compared with a reference thickness time $\Delta t_{REF}$ [step 380]. The reference thickness $\Delta t_{REF}$ depends on the CD average thickness time $\Delta t_{AV}(CD)$ and/or the DVD average thickness time $\Delta t_{AV}(DVD)$, depending whether the CD counter N(CD) has reached said minimum number $N_{MIN}$ or the DVD counter N(DVD) has reached said minimum number $N_{MIN}$, or both.

Assume that the user has played more CDs than DVDs, so that the CD counter N(CD) is the first to reach said minimum number $N_{MIN}$. Then, as long as the DVD counter N(DVD) has not yet reached said minimum number $N_{MIN}$, the check of step 305 has a negative result but the check of step 306 has a positive result. The controller 90 will then perform a reference calculation procedure 360 on the basis of the CD average thickness time $\Delta t_{AV}(CD)$ only, based on an educated estimate that the DVD average thickness time $\Delta t_{AV}(DVD)$ is expected to be approximately half the CD average thickness time $\Delta t_{AV}(CD)$. Based on this knowledge, the controller retrieves the CD average thickness time $\Delta t_{AV}(CD)$ from memory 95 [step 361] and calculates [step 362] the reference thickness time $\Delta t_{REF}$ according to the formula:

$$\Delta t_{REF} = 0.75 \cdot \Delta t_{AV}(CD)$$

The controller 90 then performs the comparison step 380.

Assume that the user has played more DVDs than CDs, so that the DVD counter N(DVD) is the first to reach said minimum number $N_{MIN}$. Then, as long as the CD counter N(CD) has not yet reached said minimum number $N_{MIN}$, the check of step 305 has a negative result but the check of step 307 has a positive result. The controller 90 will then perform a reference calculation procedure 370 on the basis of the DVD average thickness time $\Delta t_{AV}(DVD)$ only, based on an educated estimate that the CD average thickness time $\Delta t_{AV}(CD)$ is expected to be approximately twice the DVD average thickness time $\Delta t_{AV}(DVD)$. Based on this knowledge, the controller retrieves the DVD average thickness time $\Delta t_{AV}(DVD)$ from memory 95 [step 371] and calculates [step 372] the reference thickness time $\Delta t_{REF}$ according to the formula:

$$\Delta t_{REF} = 1.5 \cdot \Delta t_{AV}(DVD)$$

The controller 90 then performs the comparison step 380.

In a still later stage of its lifetime, the disc drive has handled a large enough number of DVDs and a large enough number of CDs, so that the DVD counter N(DVD) and the CD counter N(CD) both have reached said minimum number $N_{MIN}$. Then, the check of step 305 has a positive result. The controller 90 will then perform a reference calculation procedure 350 on the basis of both the CD average thickness time $\Delta t_{AV}(CD)$ and the DVD average thickness time $\Delta t_{AV}(DVD)$. The controller retrieves the CD average thickness time $\Delta t_{AV}(CD)$ from memory 95 [step 351], retrieves the DVD average thickness time $\Delta t_{AV}(DVD)$ from memory 95 [step 352], and calculates [step 353] the reference thickness time $\Delta t_{REF}$ according to the formula:

$$\Delta t_{REF} = 0.5 \cdot \{\Delta t_{AV}(CD) + \Delta t_{AV}(DVD)\}$$

The controller 90 then performs the comparison step 380.

In the comparison step 380, the measured thickness time $\Delta t$ of this current disc is compared to the reference thickness time $\Delta t_{REF}$. If the measured thickness time $\Delta t$ is larger than the reference thickness time $\Delta t_{REF}$, the controller decides that the disc is a CD and will proceed with performing the CD statistics update procedure 310 and further handling the disc according to CD format [step 319]. If the measured thickness time $\Delta t$ is smaller than the reference thickness time $\Delta t_{REF}$, the controller decides that the disc is a DVD and will proceed with performing the DVD statistics update procedure 320 and further handling the disc according to DVD format [step 329].

So, after the first stage of its lifetime where the disc drive determines disc type with the reliable but time-consuming traditional method, the disc drive has learned sufficiently "what CDs and DVDs look like", and is capable of reliably determining disc type with a fast method based fundamentally on measuring the thickness.

It should be clear to a person skilled in the art that the present invention is not limited to the exemplary embodiments discussed above, but that various variations and modifications are possible within the protective scope of the invention as defined in the appending claims.

For instance, the step of measuring the thickness time $\Delta t$ (step 302) is described as being performed directly after a new disc is inserted into the disc drive. This is, however, not necessary, the thickness time $\Delta t$ may also be measured at a later moment, for instance just before the thickness time $\Delta t$ is needed for calculation, i.e. just before steps 312, 322, 380.

Further, it is described above that the traditional recognition method 100 may also be bypassed if the number of previously handled discs is sufficiently high for CD only (step 306) or for DVD only (step 307). In an alternative embodiment, these possibilities are not implemented, so that the first stage of the life time of the disc drive ends and the traditional recognition method 100 is bypassed only if the number of previously handled discs is sufficiently high for both CD and for DVD. In that case, if the answer to the question of step 305 is negative, the procedure jumps directly to step 308.

Further, it is to be noted that the present invention is not limited to a multiple-type drive. The present invention can also be applied in a dedicated disc drive, intended for one type of disc only, to determine whether a wrong type of disc has been inserted.

Further, the present invention can likewise be used to differentiate for instance Blu-Ray discs from for instance DVD discs and CD discs.

Further, the present invention can likewise be exercised by moving the optical lens away from the disc, starting at a starting point close to the disc. Normally, however, when a new disc is inserted, or when the disc drive apparatus is switched on or initialized, the optical lens will initially be in a parking position at a relatively large distance from the disc. Nonetheless, after having measured the thickness of the disc with the method as explained above, a similar measurement can be repeated with the lens moving in the opposite direction.

The invention claimed is:

1. Method for recognizing type (CD; DVD) of an optical disc, wherein:

a light beam (32) is generated, directed towards the optical disc (2), and caused to reflect from the optical disc (2), wherein the light beam passes an optical lens (34);

said optical lens (34) is caused to move axially with respect to said optical disc (2);

the reflected light beam (32d) is received by an optical detector (35);

an output signal ($S_R$) from said optical detector (35) is analyzed to detect when (P1; $t_S$) a focus point of said light beam (32) substantially coincides with a surface of the optical disc (2) and to detect when (P2; $t_L$) said focus point of said light beam (32) substantially coincides with an information layer of the optical disc (2);

wherein a thickness time $\Delta t$ is calculated in accordance with the formula:

$$\Delta t = t_L - t_S$$

$t_S$ being the time of coincidence with said disc surface;
$t_L$ being the time of coincidence with said information layer;
wherein the measured thickness time $\Delta t$ is compared with a reference value ($\Delta t_{REF}$), and wherein it is decided that the optical disc is of a first type (CD) if the measured thickness time $\Delta t$ is larger than said reference value ($\Delta t_{REF}$), and that the optical disc is of a second type (DVD) if the measured thickness time $\Delta t$ is smaller than said reference value ($\Delta t_{REF}$);

wherein said reference value ($\Delta t_{REF}$) is calculated from an experience-based average value ($\Delta t_{AV}(CD)$) of the thickness time $\Delta t$ of CD discs, or from an experience-based average value ($\Delta t_{AV}(DVD)$) of the thickness time $\Delta t$ of DVD discs, or from both.

2. Method according to claim 1, wherein, for each expected disc type (CD; DVD), a corresponding disc type counter (N(CD); N(DVD)) is defined and a corresponding average type thickness time ($\Delta t_{AV}(CD)$; $\Delta t_{AV}(DVD)$) is defined;

and wherein, on recognition of a specific disc type, the value of the corresponding disc type counter is increased and the value of the corresponding average type thickness time is updated.

3. Method according to claim 2, wherein an average type thickness time ($\Delta t_{AV}$) is calculated as a mathematical average of over the last N discs of the corresponding type.

4. Method according to claim 2, wherein an average type thickness time ($\Delta t_{AV}(type)$) is calculated according to $$\Delta t_{AV}(type)_{NEW} = (1-x) \cdot \Delta t_{AV}(type)_{OLD} + x \cdot \Delta t,$$

wherein x is a predefined factor between 0 and 1; and wherein "type" indicates disc type (CD; DVD).

5. Method according to claim 4, wherein x=0.1.

6. Method according to claim 2, wherein, after a new disc (2) is inserted (step 301) in a disc drive (1), the values of all disc type counters are compared with a predefined minimum value ($N_{MIN}$);

wherein, if all disc type counters have a counter value above the predefined minimum value ($N_{MIN}$), said reference value ($\Delta t_{REF}$) is calculated in the interval between both average type thickness times ($\Delta t_{AV}(CD)$; $\Delta t_{AV}(DVD)$).

7. Method according to claim 6, wherein said reference value ($\Delta t_{REF}$) is calculated according to $$\Delta t_{REF} = 0.5 \cdot \{\Delta t_{AV}(type1) + \Delta t_{AV}(type2)\}$$

wherein $\Delta t_{AV}(type1)$ is the average type thickness time of a first disc type (CD) and wherein $\Delta t_{AV}(type2)$ is the average type thickness time of a second disc type (DVD).

8. Method according to claim 2, wherein, after a new disc (2) is inserted (step 301) in a disc drive (1), the values of all disc type counters are compared with a predefined minimum value ($N_{MIN}$);

wherein, if only the one disc type counter (N(DVD)) corresponding to the smallest average type thickness time ($\Delta t_{AV}(DVD)$) has a counter value above the predefined minimum value ($N_{MIN}$), said reference value ($\Delta t_{REF}$) is calculated according to $$\Delta t_{REF} = 0.5 \cdot (x+1) \cdot \Delta t_{AV}(DVD)$$

wherein x is a predetermined ratio between the expected largest average type thickness time and the expected smallest average type thickness time.

9. Method according to claim 2, wherein, after a new disc (2) is inserted (step 301) in a disc drive (1), the values of all disc type counters are compared with a predefined minimum value ($N_{MIN}$);

wherein, if only the one disc type counter (N(CD)) corresponding to the largest average type thickness time ($\Delta t_{AV}$(CD)) has a counter value above the predefined minimum value ($N_{MIN}$), said reference value ($\Delta t_{REF}$) is calculated according to $$\Delta t_{REF} = (x+1) \cdot \Delta t_{AV}(CD)/2x$$

wherein x is a predetermined ratio between the expected largest average type thickness time and the expected smallest average type thickness time.

10. Method according to claim 8, wherein x=2 in case the first disc type is DVD and the second disc type is CD.

11. Method for recognizing type (CD; DVD) of an optical disc, wherein:

a light beam (32) is generated, directed towards the optical disc (2), and caused to reflect from the optical disc (2), wherein the light beam passes an optical lens (34);

the reflected light beam (32d) is received by an optical detector (35);

an output signal ($S_R$) from said optical detector (35) is received;

said optical lens (34) is caused to move axially with respect to said optical disc (2);

said output signal ($S_R$) is analyzed to detect when (P1; $t_S$) a focus point of said light beam (32) substantially coincides with a surface of the optical disc (2) and to detect when (P2; $t_L$) said focus point of said light beam (32) substantially coincides with an information layer of the optical disc (2);

wherein a thickness time $\Delta t$ is calculated in accordance with the formula:

$$\Delta t = t_L - t_S$$

$t_S$ being the time of coincidence with said disc surface;

$t_L$ being the time of coincidence with said information layer;

wherein, for each expected disc type (CD; DVD), a corresponding disc type counter (N(CD); N(DVD)) is defined and a corresponding average type thickness time ($\Delta t_{AV}(CD)$; $\Delta t_{AV}(DVD)$) is defined;

wherein, after a new disc (2) is inserted (step 301) in a disc drive (1), the values of all disc type counters are compared with a predefined minimum value ($N_{MIN}$);

wherein, if all disc type counters have a counter value below the predefined minimum value ($N_{MIN}$), the type of disc is determined by any suitable method, for instance a traditional method (100);

and wherein, on recognition of a specific disc type, the value of the corresponding disc type counter is increased and the value of the corresponding average type thickness time is updated.

12. Disc drive apparatus (1), designed to perform a disc type recognition method (300) according to claim 1.

13. Disc drive apparatus (1) according to claim 12, wherein the disc drive apparatus (1) is adapted to handle one disc type only, and wherein the disc drive apparatus (1) rejects an inserted disc if the disc type recognition procedure reveals that the inserted disc is not a correct disc.

14. Disc drive apparatus (1), designed to perform a disc type recognition method according to claim 12;

wherein the disc drive apparatus (1) is adapted to handle at least two different disc types (CD; DVD), and wherein the disc drive apparatus (1) proceeds (319; 329) with handling an inserted disc in accordance with the disc type (CD; DVD) as revealed by the disc type recognition procedure (300).

* * * * *